United States Patent
Heydt et al.

(10) Patent No.: US 6,664,749 B2
(45) Date of Patent: Dec. 16, 2003

(54) SPINDLE MOTOR INITIALIZATION AFTER A CONTROL PROCESSOR RESET CONDITION IN A DISC DRIVE

(75) Inventors: Jeffrey A. Heydt, Oklahoma City, OK (US); David R. Street, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/966,383

(22) Filed: Sep. 28, 2001

(65) Prior Publication Data

US 2002/0171380 A1 Nov. 21, 2002

Related U.S. Application Data (60) Provisional application No. 60/282,235, filed on Apr. 6, 2001.

(51) Int. Cl.⁷ .............................. H02P 6/20; H02P 6/18
(52) U.S. Cl. ..................... 318/254; 318/431; 318/459; 388/928.1
(58) Field of Search ................................ 318/138, 254, 318/375, 379, 430, 431, 439, 720, 721, 459, 500; 388/928.1

(56) References Cited

U.S. PATENT DOCUMENTS

| | | | |
|---|---|---|---|
| 4,130,769 A | 12/1978 | Karube | |
| 4,169,990 A | 10/1979 | Lerdman | |
| 4,405,885 A | 9/1983 | Okamoto | |
| 4,531,079 A | 7/1985 | Müller | |
| 4,631,459 A | 12/1986 | Fujioka et al. | |
| 4,633,150 A | 12/1986 | Inaji et al. | |
| 4,712,050 A | 12/1987 | Nagasawa et al. | |
| 4,742,282 A | * 5/1988 | Okutani et al. | 318/374 |
| 4,748,386 A | 5/1988 | Nakanishi et al. | |
| 4,888,533 A | 12/1989 | Gotoh et al. | |
| 4,896,807 A | 1/1990 | Mundschau | |
| 4,926,101 A | * 5/1990 | Enomoto et al. | 318/374 |
| 4,992,710 A | 2/1991 | Cassat | |
| 5,001,405 A | 3/1991 | Cassat | |
| 5,010,283 A | * 4/1991 | Kitajima et al. | 318/373 |
| 5,028,852 A | 7/1991 | Dunfield | |
| 5,117,165 A | 5/1992 | Cassat et al. | |
| 5,159,246 A | 10/1992 | Ueki | |
| 5,166,583 A | 11/1992 | Min et al. | |
| 5,184,038 A | 2/1993 | Matsui et al. | |
| 5,189,574 A | 2/1993 | Imamura et al. | |
| 5,191,270 A | * 3/1993 | McCormack | 318/254 |
| 5,254,914 A | 10/1993 | Dunfield et al. | |
| 5,274,310 A | 12/1993 | Bahn | |
| 5,285,135 A | 2/1994 | Carobolante et al. | |
| 5,298,839 A | 3/1994 | Takeda | |
| 5,334,917 A | 8/1994 | Lind | |
| 5,343,127 A | 8/1994 | Maiocchi | |
| 5,378,976 A | 1/1995 | Inaji et al. | |
| 5,397,972 A | 3/1995 | Maiocchi | |

(List continued on next page.)

Primary Examiner—Bentsu Ro
(74) Attorney, Agent, or Firm—Fellers, Snider, et al.

(57) ABSTRACT

Method and apparatus for initializing a disc drive to bring a spindle motor to a final, operational velocity after a disc drive processor reset condition. The spindle motor is rotated using electronic commutation and back electromotive force (bemf) detection. Upon initialization of the disc drive, a control circuit checks for the presence or absence of detected bemf. The absence of bemf indicates the spindle motor is either at rest or is rotating at a relatively low velocity. In the absence of bemf, the electrical rotational position of the spindle motor is determined, a short braking pulse is applied to the motor, and rotation of the spindle motor is detected in relation to changes in the electrical rotational position. Further breaking pulses are applied until no apparent change in electrical rotational position is detected, after which the spindle motor is accelerated from rest to the final, operational velocity.

27 Claims, 6 Drawing Sheets

U.S. PATENT DOCUMENTS

| | | |
|---|---|---|
| 5,428,276 A | 6/1995 | Carobolante et al. |
| 5,541,488 A | 7/1996 | Bansal et al. |
| 5,569,990 A * | 10/1996 | Dunfield .................... 318/254 |
| 5,631,999 A | 5/1997 | Dinsmore |
| 5,703,449 A | 12/1997 | Nagate et al. |
| 5,777,448 A | 7/1998 | Matsui |
| 5,780,983 A | 7/1998 | Shinkawa et al. |
| 5,841,252 A | 11/1998 | Dunfield |
| 5,870,363 A | 2/1999 | Sun et al. |
| 5,929,577 A | 7/1999 | Neidorff et al. |
| 5,963,706 A | 10/1999 | Baik |
| 5,982,119 A * | 11/1999 | Okada et al. ................ 318/286 |
| 5,982,571 A | 11/1999 | Calfee et al. |
| 5,998,946 A | 12/1999 | Kim |
| 6,078,158 A | 6/2000 | Heeren et al. |
| 6,100,656 A | 8/2000 | El-Sadi et al. |
| 6,160,367 A | 12/2000 | Higashi et al. |

* cited by examiner

SPINDLE MOTOR INITIALIZATION AFTER A CONTROL PROCESSOR RESET CONDITION IN A DISC DRIVE

RELATED APPLICATIONS

This application claims priority to Provisional Application No. 60/282,235 filed Apr. 6, 2001.

FIELD THE INVENTION

The claimed invention relates generally to the field of disc drive data storage devices and more particularly, but not by way of limitation, to a method and apparatus for initializing a spindle motor after a disc drive control processor reset condition.

BACKGROUND

A disc drive is a data storage device used to store digital data. A typical disc drive includes a number of rotatable magnetic recording discs which are axially aligned and mounted to a spindle motor for rotation at a constant, high velocity. A corresponding array of read/write heads access tracks defined on the respective disc surfaces to write data to and to read data from the discs.

Control electronics are provided to direct the transfer of data between the discs and a host device. Such electronics are typically housed on an external printed circuit board (PCB) and include a control processor that provides top level control of the disc drive.

When a disc drive is initialized (i.e., comes out of a "reset" condition), the control processor executes an initialization sequence to place the drive in an operational state. This initialization sequence can vary from drive to drive, but generally involves initial tests of the various electronic subsystems on the PCB, after which appropriate parameters are loaded into such systems for use during operation. The spindle motor is accelerated to a velocity sufficient to aerodynamically support the heads over the discs, the heads are moved out over the disc surfaces, and the control processor reports to the host that the disc drive is fully operational and ready to receive data transfer commands.

Usually, a disc drive initialization sequence occurs after the disc drive has been at rest for an extended period of time, in which case the discs will not be spinning at the start of initialization. However, it is possible that a momentary power drop out has just occurred to cause the reset condition, or that a technician has initiated the reset condition during evaluation of the drive. In these latter two circumstances, the control processor can come out of reset and begin the initialization sequence while the discs are still spinning. It is important to determine whether the discs are spinning upon initialization, as the state of the motor will determine the appropriate manner in which drive signals are applied to accelerate the motor to the final, desired operational velocity.

Disc drives of the present generation typically use electronic commutation and back electromotive force (bemf) detection to provide spindle motor control, such as discussed in U.S. Pat. No. 5,631,999 issued to Dinsmore. Such approach generally entails applying a predetermined sequence of commutation steps to the phase windings of the spindle motor over each electrical revolution of the motor. A commutation step involves supplying the motor with current to one phase, sinking current from another phase, and holding a third phase at a high impedance in an unenergized state. Detection circuitry measures the bemf generated on the unenergized phase, compares this voltage to the voltage at a center tap, and outputs a signal at a zero crossing of the voltages; that is, when the bemf voltage changes polarity with respect to the voltage at the center tap. The point at which the zero crossing occurs is then used as a reference for the timing of the next commutation pulse, as well as a reference to indicate the position and relative velocity of the motor.

Above an intermediate velocity, such as 1000 revolutions per minute (rpm), the detection circuitry will generally be able to reliably detect rotation of the spindle motor. Hence, when the control processor comes out of reset and determines from the detection circuitry that the discs are spinning at or above this intermediate velocity, the processor directs the motor control circuitry to obtain frequency lock on the spindle motor and accelerate the motor to the final operational velocity (such as around 15,000 rpm). However, if the control processor comes out of reset and the detection circuitry does not detect the presence of zero crossing signals, the state of the motor remains unknown; the discs may be stationary, or the discs may be spinning at a low rate (less than 1000 rpm, for example).

Application of drive signals to a spindle motor while the spindle motor is in an unknown state should be avoided at all costs, since such drive signals could lead to the inadvertent rotation of the motor in the wrong direction. Rotating the spindle motor in the wrong direction, even for a very short time, can lead to premature failure of the disc drive; heads and disc surfaces can be damaged, and lubricating fluid used in hydrodynamic spindle motor bearings can be pumped out of the bearings.

To avoid such damage, control processors in prior art drives have applied a braking pulse to the motor upon initialization when no rotation of the discs is detected to ensure that the spindle motor is in a stationary, nonrotation state before the application of drive currents to the motor. Such braking pulse typically comprises the shorting together of the motor phase windings for a significant amount of time, such as 1.5 seconds, to ensure in all cases that the spindle motor is fully at rest. After the conclusion of the braking pulse, the control processor directs the motor driver circuitry to initiate acceleration of the spindle motor from a known, rest state.

While advantageously preventing damage to the drive, such pulses significantly add to the total time required to bring the drive to an operational state. Note that every time the drive is turned on after sitting for hours in an off condition, the delay is still applied to the motor. Customer requirements continue to demand reductions in the overall time required to place a disc drive in an operationally ready state, and the unnecessary application of a significant braking delay to discs already at rest runs counter to this requirement.

Accordingly, there is a need for improvements in the art whereby the rotational state of a spindle motor can be efficiently and reliably determined after a disc drive control processor comes out of a reset condition without the need for global application of a significant braking delay every time the disc drive is initialized. It is to such improvements that the present invention is directed.

SUMMARY OF THE INVENTION

In accordance with preferred embodiments, a disc drive includes a spindle motor, back electromotive force (bemf) detection circuitry which detects bemf from rotation of the spindle motor above an intermediate velocity, and commutation circuitry which electrically commutates the spindle motor in relation to the detected bemf over a range of electrical rotational positions.

Upon disc drive initialization, a control circuit of the disc drive determines whether bemf is detected from the spindle motor. If so, the control circuit directs the commutation circuitry to obtain frequency lock on the motor and accelerate the motor to a final, operational velocity at which the drive operates to transfer data between the discs and a host device. On the other hand, the absence of detected bemf from the spindle motor indicates that the spindle motor is either stationary, or is rotating at a rate below the intermediate velocity; thus, the absence of detected bemf results in uncertainty with regard to the state of the spindle motor.

Accordingly, when no bemf is detected the control circuit proceeds to identify the electrical rotational position of the spindle motor. A braking pulse of relatively short duration is applied to the spindle motor, after which the electrical rotational position of the spindle motor is again identified. A change in the electrical rotational position of the spindle motor after application of the braking pulse as compared to the electrical rotational position before application of the braking pulse provides a reliable indication that the spindle motor is still rotating, whereas no apparent change in electrical rotational position indicates that the spindle motor is at rest.

When the spindle motor is determined to be at rest, the spindle motor is accelerated from rest to the final, operational velocity. Alternatively, when the spindle motor is determined to be still rotating, another braking pulse is applied and electrical rotational position of the spindle motor is again identified. The process continues until no apparent change is detected in motor position, after which the motor is accelerated to the operational velocity.

The electrical rotational position of the spindle motor is preferably determined by sequentially applying a drive pulse to each of a plurality of commutation states respectively corresponding to each of the electrical rotational positions. A corresponding rise time for a resulting voltage induced by application of each said drive pulse is measured. The rise time is established by the impedance of the spindle motor, and the impedance of the spindle motor is established by the electrical rotational position of the motor. The relative values of the various rise times will thus readily lead to correct identification of the existing electrical rotational position of the motor.

An advantage of this approach is that uncertainty in the rotation of a spindle motor upon initialization can be quickly and reliably resolved without the need to apply a braking pulse of substantial duration to the spindle motor each time that the disc drive is initialized.

These and various other features and advantages which characterize the claimed invention will be apparent from a reading of the following detailed description and a review of the associated drawings.

BRIEF DESCRIPTION OF THE DRAWINGS

FIG. 6 is a graphical representation of a sensed voltage and a corresponding timing measurement obtained using the RPS circuitry of FIG. 4 during the steps of the flow chart of FIG. 5.

DETAILED DESCRIPTION

Figure 1:
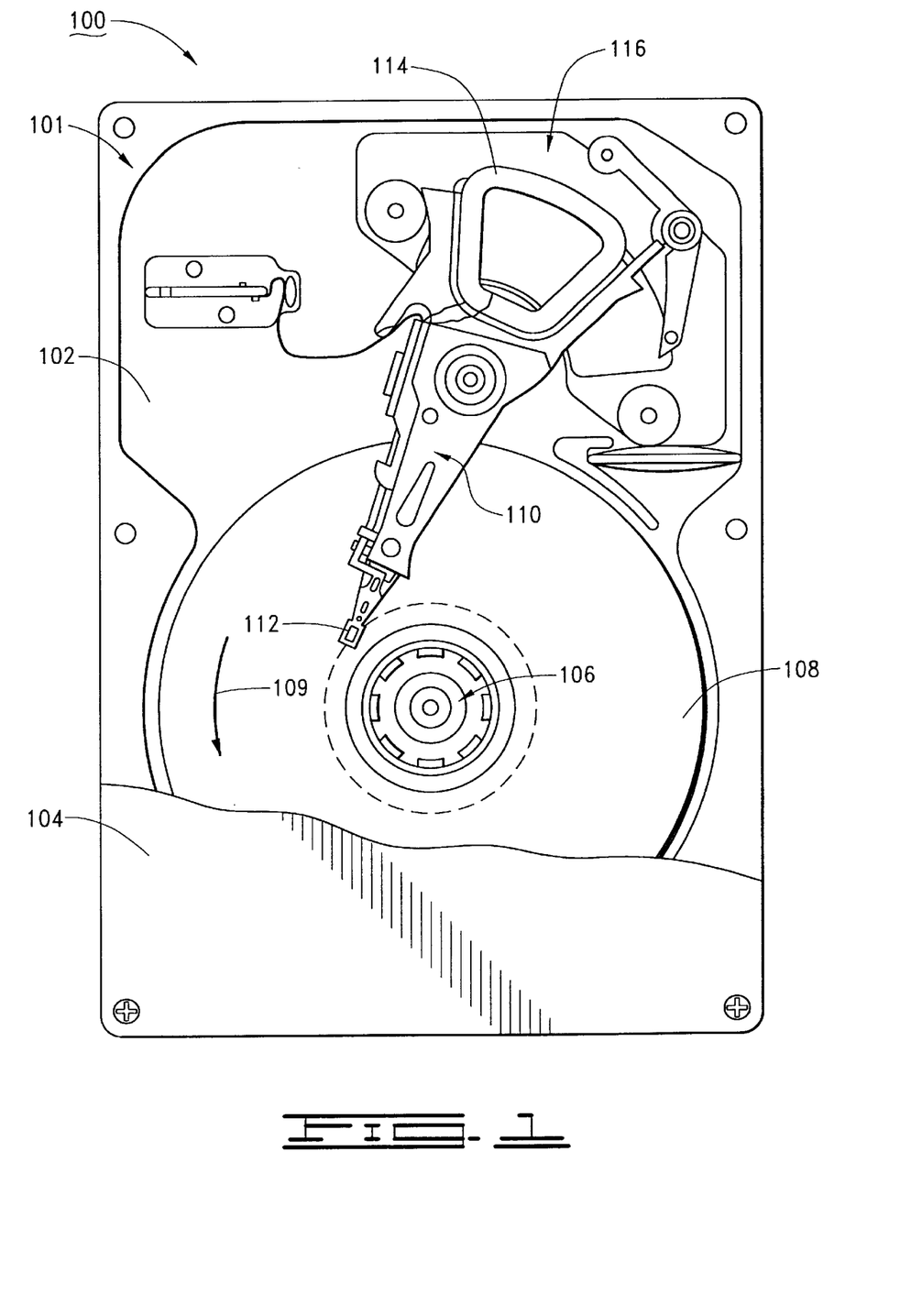
FIG. 1 is a top plan view of a disc drive constructed in accordance with preferred embodiments of the present invention.

FIG. 1 provides a top plan view of a disc drive 100 constructed in accordance with preferred embodiments of the present invention. A base deck 102 and a top cover 104 (shown in partial cutaway) cooperate to form a sealed housing for the disc drive 100. A spindle motor 106 rotates a number of magnetic recording discs 108 in rotational direction 109. An actuator assembly 110 supports an array of read/write heads 112 adjacent the respective disc surfaces. The actuator assembly 110 is rotated through the application of current to an actuator coil 114 of a voice coil motor (VCM) 116.

Figure 2:
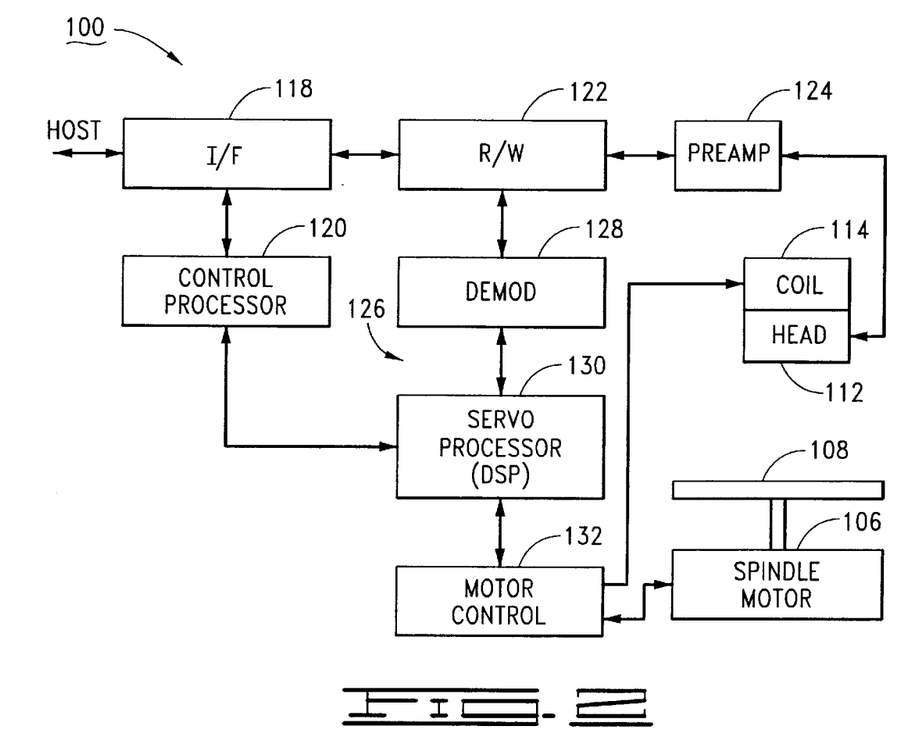
FIG. 2 provides a functional block diagram of the disc drive of FIG. 1.

FIG. 2 provides a functional block diagram of the disc drive 100. FIG. 2 includes control circuitry provided on a disc drive printed circuit board (PCB) affixed to the underside of the HDA 101, and thus not visible in FIG. 1.

Data and host commands are provided from a host device to the disc drive 100 using interface (I/F) circuitry 118 in conjunction with a top level control processor 120. Data are transferred between the discs 108 and the host device using the I/F circuitry 118, a read/write (R/W) channel 122, and a preamplifier/driver (preamp) circuit 124.

Head positional control is provided by a closed-loop servo circuit 126 comprising demodulation (demod) circuitry 128, a servo processor 130 (preferably comprising a digital signal processor, DSP) and motor control circuitry 132. The motor control circuitry 132 applies drive currents to the actuator coil 114 to rotate the actuator 110. The motor control circuitry 132 further applies drive signals to the spindle motor 106 to rotate the discs 108.

Figure 3:
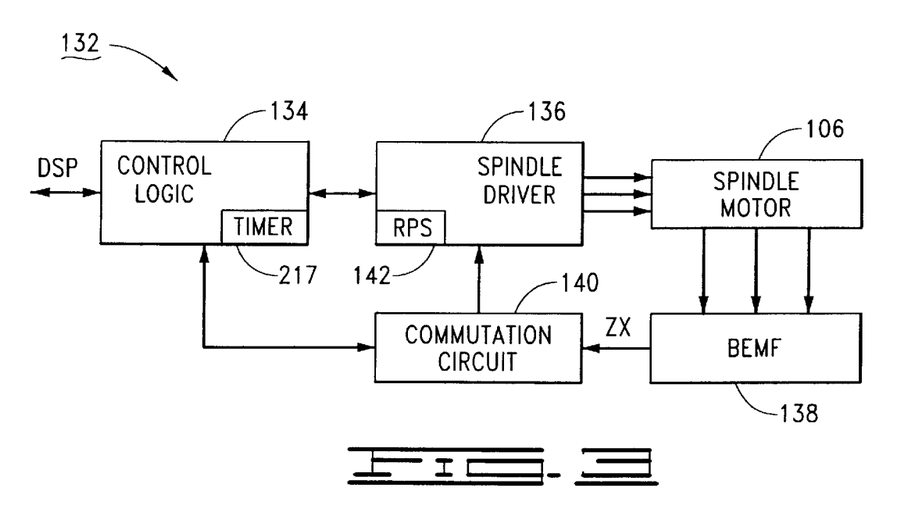
FIG. 3 provides a functional block diagram of relevant portions of the motor control circuitry of FIG. 2.

FIG. 3 provides a functional block diagram of relevant portions of the motor control circuitry 132 of FIG. 2. Control logic 134 receives commands from and outputs state data to the DSP 130. Spindle driver circuitry 136 applies drive currents to the phases of the spindle motor 106 over a number of sequential commutation steps to rotate the motor. During each commutation step, current is applied to one phase, sunk from another phase, and a third phase is held at a high impedance in an unenergized state.

Back electromotive force (bemf) detection circuitry 138 measures the bemf generated on the unenergized phase, compares this voltage to the voltage at a center tap, and outputs a zero crossing (ZX) signal when the bemf voltage changes polarity with respect to the voltage at the center tap. A commutation circuit 140 uses the ZX signals to time the application of the next commutation step.

Figure 4:
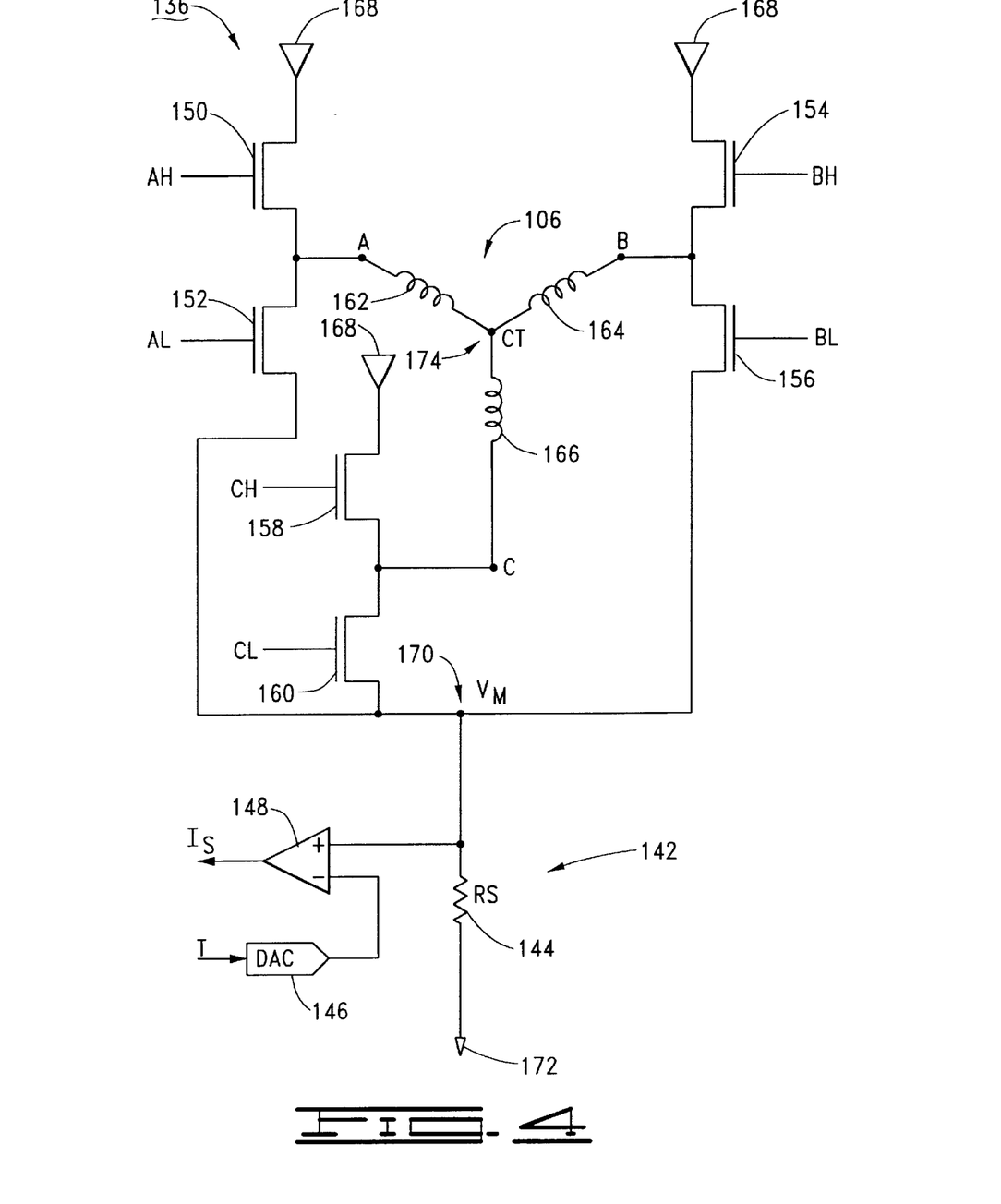
FIG. 4 provides a schematic representation of rotor position sense (RPS) circuitry of the motor control circuitry of FIG. 3.

The spindle driver circuitry 136 includes rotor position sense (RPS) circuitry 142 to detect electrical position of the spindle motor 106 in a manner to be discussed shortly. At this point it will be noted, with reference to FIG. 4, that the RPS circuitry 142 includes a sense resistor RS 144, a digital to analog converter (DAC) 146 and a comparator 148. FIG. 4 also shows the spindle driver circuitry 136 to include six field effect transistors (FETs) 150, 152, 154, 156, 158 and 160, with inputs denoted as AH (A high), AL (A low), BH, BL, CH and CL, respectively.

Controlled, timed application of drive currents to the various FETs result in flow of current through A, B and C phase windings 162, 164 and 166 from a voltage source 168 (such as +12 volts) to $V_M$ node 170, through the RS sense resistor 144 to reference node (ground) 172. Spindle motor commutation steps defined in Table 1:

TABLE 1

| Commutation State | Source Phase | Sink Phase | Phase Held at High Impedance |
|---|---|---|---|
| 1 | A | B | C |
| 2 | A | C | B |
| 3 | B | C | A |
| 4 | B | A | C |
| 5 | C | A | B |
| 6 | C | B | A |

During commutation step 1, phase A (winding 162) is supplied with current, phase B (winding 164) outputs (sinks) current, and phase C (winding 166) is held at high impedance. This is accomplished by selectively turning on AH FET 150 and BL FET 156, and turning off AL FET 152, BH FET 154, CH FET 158 and CL FET 160. In this way, current flows from source 168, through AH FET 150, through A phase winding 162, through the center tap (CT node 174), through B phase winding 164, through BL FET 156 to $V_M$ node 170, and through RS sense resistor 144 to ground 172. The resulting current flow through the A and B phase windings 162, 164 induce electromagnetic fields which interact with a corresponding array of permanent magnets (not shown) mounted to the rotor (spindle motor hub), thus inducing a torque upon the spindle motor hub in the desired rotational direction. The appropriate FETs are sequentially selected to achieve the remaining commutation states shown in Table 1.

It will be noted that each cycle through the six commutation states of Table 1 comprises one electrical revolution of the motor. The number of electrical revolutions in a physical, mechanical revolution of the spindle motor is determined by the number of poles. A 3 phase, 12 pole motor will have four electrical revolutions for each mechanical revolution of the spindle motor.

The frequency at which the spindle motor 106 is commutated, referred to as the commutation frequency FCOM, is determined as follows:

$$FCOM = (phases)(poles)(RPM)/60 \quad (1)$$

A three-phase, 12 pole spindle motor operated at nominally 15,000 revolutions per minute would produce a commutation frequency of:

$$FCOM = (3)(12)(15,000)/60 = 9,000 \quad (2)$$

or 9 kHz. The commutation circuit 140 will thus commutate the spindle driver 136 at nominally this frequency to maintain the spindle motor 106 at the desired operational velocity of 15,000 rpm. The foregoing relations can be used to determine the actual motor velocity (and therefore velocity error) in relation to the frequency at which the zero crossing ZX pulses are provided from the bemf detection circuitry 138.

Figure 5:
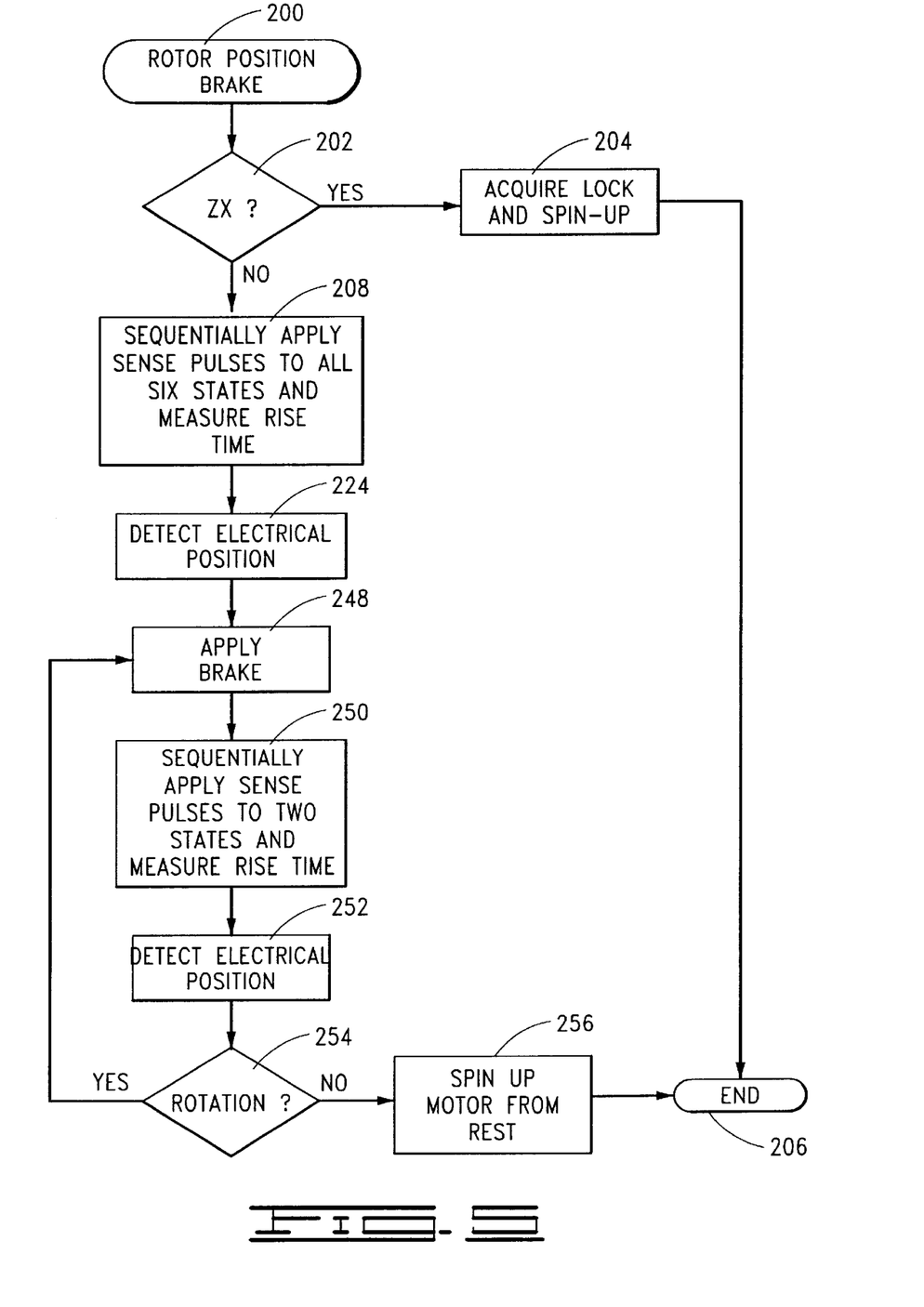
FIG. 5 is a flow chart for a ROTOR POSITION BRAKE routine illustrative of steps carried out in accordance with preferred embodiments of the present invention to determine rotational state of the spindle motor as the disc drive processor comes out of a reset condition.

Having concluded a review of relevant circuitry of the disc drive 100, reference is now made to FIG. 5, which provides a flow chart for a ROTOR POSITION BRAKE routine 200, illustrative of steps carried out by the disc drive 100 in accordance with preferred embodiments of the present invention. It will be understood that the routine 200 is preferably carried out each time the disc drive 100 is initialized (that is, each time the control processor 120 comes out of reset).

The routine begins with an initial inquiry at decision step 202 to determine whether zero crossing (ZX) signals are being output from the bemf detection circuitry 138. As discussed above, under certain circumstances the disc drive control processor 120 can come out of a temporary reset condition while the discs 108 are still spinning. When this happens, and the rotational speed of the discs 108 is above a nominal level (such as above about 1000 rpm depending upon the configuration of the drive), the bemf detection circuitry 138 will be able to output ZX signals in response to the rotation of the spindle motor 106. In this case the routine passes from step 202 to step 204, wherein the processor 120 commands the motor control circuitry 132 to acquire frequency lock and accelerate the spindle motor 106 to the final, operational velocity (e.g., 15,000 rpm) at which data access (read/write) operations are performed. Once this is achieved, the routine ends at step 206.

Contrawise, when ZX signals are not provided from the bemf detection circuitry 138, the state of the spindle motor is uncertain. Acceleration of the motor is deferred until this uncertainty is resolved. The routine passes from step 202 to step 208, during which the motor driver circuitry 132 proceeds to sequentially apply drive pulses to all six commutation states and use the RPS circuitry 142 to measure the associated rise time of the voltage at $V_M$ node 170. The drive pulses are of small enough amplitude and duration so as to not impart a torque to the spindle motor sufficient to induce movement of the motor, but the pulses are provided with sufficient amplitude and duration to enable detection of the electrical position of the spindle motor 106. FIG. 6 provides a graphical illustration of the operation of this step.

FIG. 6 provides a $V_M$ voltage signal curve 210 and a corresponding $I_S$ pulse curve 212, plotted against a common elapsed time x-axis 214 and a common amplitude y-axis 216. Using the commutation state 1 discussed above by way of example, a small duration pulse is applied by the controlled activation of AH and BL FETs 150, 156 (FIG. 4). A timer 217 (preferably disposed in the control logic block 134, FIG. 3) is initiated at this time (time $t_0$). A suitable digital value for a threshold T is input to the DAC 146 (FIG. 4, also preferably by the control logic 134). The resulting voltage at $V_M$ node 170 will rise in relation to the impedance of the spindle motor 106, and the impedance of the spindle motor 106 will vary depending upon the electrical position of the motor.

The comparator 148 is configured to receive the $V_M$ voltage at its + input and the (analog equivalent) threshold voltage T at its − input. When the $V_M$ voltage eventually reaches the threshold level T (as indicated by broken threshold line 218 in FIG. 6), the comparator will output an $I_S$ pulse 220, as shown in FIG. 6. The receipt of the $I_S$ pulse will cause the control logic 134 to stop the timer (time $t_1$), report the elapsed time between $t_0$ and $t_1$, and instruct the spindle driver circuitry 136 to cease further application of the drive pulse (i.e., AH and BL FETs 150, 156 are turned off). For clarity, the remaining shape of the voltage $V_M$ after time $t_1$ is shown in FIG. 6 in broken line fashion at 222, to illustrate what voltage would have continued to have been observed at the $V_M$ node 170 had the pulse not been truncated by the control logic 134.

Figure 7:
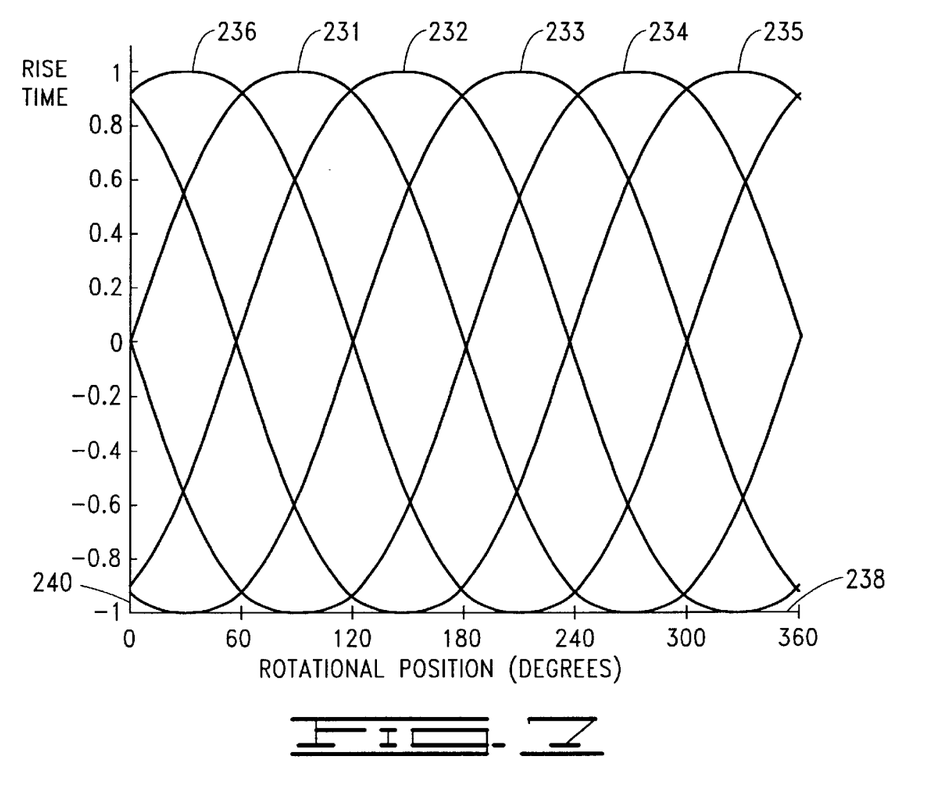
FIG. 7 is a graphical representation of rise times versus electrical position for each commutation state of the spindle motor.
Figure 8:
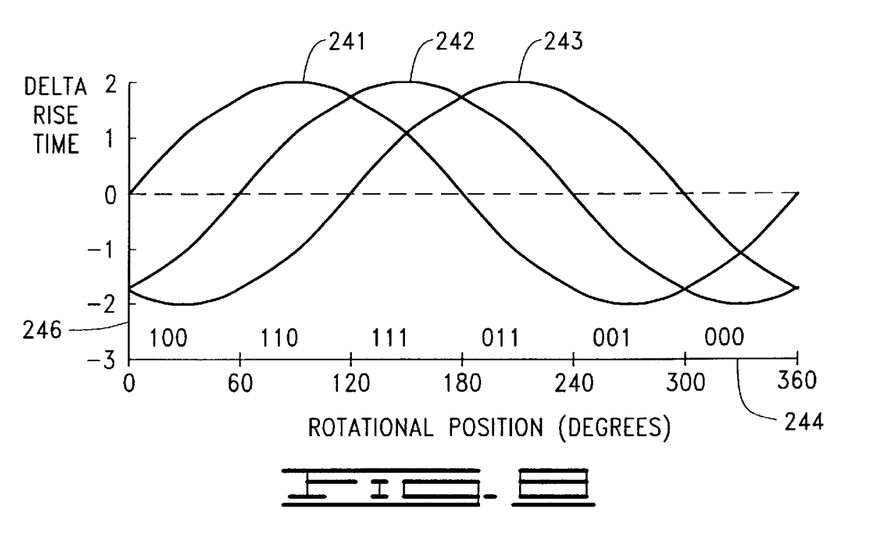
FIG. 8 is a graphical representation of differences in rise times (delta rise times) versus electrical position for each commutation state.

The foregoing operation is thus performed during step 208 for each of the six commutation states in turn, and an elapsed time (time $t_0$ to $t_1$) is obtained for each of the six commutation states. The routine of FIG. 5 then passes to step 224 where the elapsed times are used to detect the electrical position of the spindle motor 106. FIGS. 7 and 8 have been provided to illustrate how this is preferably accomplished.

FIG. 7 provides a graphical representation of rise time versus electrical (rotational) position for each of the six commutation states of Table 1. Particularly, FIG. 7 provides substantially sinusoidal curves 231, 232, 233, 234, 235 and 236 plotted against position x-axis 238 and rise time y-axis 240. The curves are normalized over a range of +1 to −1 and correspond to the six commutation states of Table 1 as follows: curve 231 represents the normalized rise time for commutation state 1, curve 232 corresponds to commutation state 2, and so on. The curves are complimentary in nature: state 1 (curve 231) is the complement of state 4 (curve 234); state 2 is the complement of state 5 (curve 235); and state 3 is the complement of state 6 (curve 236). This is to be expected since, as shown by Table 1, the commutation of step 1 (application of current to phase A and the sinking of current from phase B) is the direct opposite of commutation step 4 (application of current to phase B and the sinking of current from phase A).

The differences in rise times between each pair of complementary states are plotted in FIG. 8, which provides delta rise time curves 241, 242 and 243 shown against electrical rotational position x-axis 244 and normalized amplitude y-axis 246. It can readily be seen from a comparison of FIGS. 7 and 8 that delta curve 241 represents the difference (delta) between states 1 and 4 (curves 231 and 234); delta curve 242 represents the difference between states 2 and 5 (curves 232 and 235); and delta curve 243 represents the difference between states 3 and 6 (curves 233 and 236).

It can further be seen from review of FIG. 8 that the electrical position of the spindle motor 106 can be expressed as a three-digit binary number corresponding to each of six zones of the commutation cycle. For example, in the first zone, when the spindle motor 106 is in an electrical position of between zero and 60 degrees, the values of the delta curves 241, 242 and 243 have corresponding values of {1,0,0}. That is, the curve 241 has a positive value greater than zero (which is assigned a value of one) and the curves 242, 243 have negative values less than zero (and are assigned values of zero). As the spindle motor 106 rotates to a position between 60 and 120 electrical degrees, the delta curve 242 (representing the difference between states 2 and 5) will transition from a negative to a positive value, resulting in a change of position to {1,1,0}. As the spindle motor 106 continues to rotate, one of the values in the three-digit binary position set will transition from a zero to a one or vice versa as each successive zone is encountered.

These observations are advantageous for at least two reasons: first, the electrical position (zone) of the spindle motor 106 can readily be determined in relation to the elapsed rise times for all six commutation states. Calculations can be made in accordance with the graphs of FIGS. 7 and 8, or predefined lookup tables can be used to identify the electrical position from the measured values. Second, once the electrical position (zone) of the spindle motor 106 is determined, subsequent measurements of electrical position can be limited to just those two commutation states that will next undergo a transition in delta value. For example, if the spindle motor 106 is determined to be in the first zone, subsequent measurements only need be made of states 2 and 5 to detect passage of the spindle motor 106 into the second zone.

Returning to the routine of FIG. 5, it will now be understood that the operation of step 224 results in the detection of the electrical position of the spindle motor 106 in relation to one of the six zones shown in FIG. 8. The routine proceeds at step 248 to apply a braking pulse to the spindle motor 106. This braking pulse preferably comprises the application of an electrical short across all three phase windings 162, 164, 166 for a relatively short duration of time, such as 100 milliseconds (0.1 sec). This can readily be accomplished, for example, by concurrently energizing AL FET 152, BL FET 156 and CL FET 160.

The routine then passes to step 250 wherein drive pulses are applied to the two appropriate states subject to change should the motor rotate into a new zone and rise times are measured for these two states in the manner described above. The electrical position of the spindle motor 106 is then detected at step 252.

Decision step 254 inquires whether rotation of the spindle motor 106 is detected as a result of change in zone between that detected in step 224 and that detected in step 252. If so, the routine passes back to step 248 for application of another braking pulse. On the other hand, once verification is made that the spindle motor 106 is no longer rotating, the routine passes from decision step 254 to step 256 in which the processor 120 commands the motor control circuitry 134 to accelerate the spindle motor 106 from rest to the operational velocity. Once the operational velocity is reached, the routine ends at step 206.

Although the routine of FIG. 5 only shows application of a single braking operation at step 248 and two position measurements at steps 224 and 252, it will be understood that additional measurements can be made before making the final determination that the spindle motor 106 is in fact stationary. Moreover, should a relatively large change in zone (such as from zone 1 to zone 4) be observed between the measurements of step 224 and step 252, in an alternative embodiment a slightly longer braking pulse can be selectively applied during the subsequent operation of step 248 to hasten the deceleration of the spindle motor.

Regardless, it is contemplated that the operation of the routine of FIG. 5 will provide a significant reduction in the time required to determine whether the spindle motor 106 is rotating upon initialization, and if so, will operate to more reliably ensure that the spindle motor is at rest before the decision is made to proceed with spin-up.

Accordingly, it will now be understood that the present invention, as embodied herein and as claimed below, is directed to a method and apparatus for initializing a disc drive. In accordance with preferred embodiments, a disc drive (such as 100) includes a spindle motor (such as 106), back electromotive force (bemf) detection circuitry (such as 138) which detects bemf from rotation of the spindle motor above an intermediate velocity, and commutation circuitry (such as 140) which electrically commutates the spindle motor in relation to the detected bemf over a range of electrical rotational positions.

Upon initialization, the spindle motor is determined to be either stationary or rotating at a rate below the intermediate velocity in relation to an absence of detected bemf from the spindle motor (such as by step 202). The electrical rotational position of the spindle motor is determined (such as by steps 208, 224) and a braking pulse of relatively short duration is applied to the spindle motor (such as by step 248). The electrical rotational position of the spindle motor is again determined at the conclusion of the braking pulse (such as by steps 250, 252), and a determination is made whether the spindle motor is still rotating in relation to a change in the electrical rotational position (such as by step 254).

Once the spindle motor is determined to be at rest, the spindle motor is accelerated from rest to a final operational velocity (such as by step 256). On the other hand, if the spindle motor is determined to still be rotating, another braking pulse is applied and electrical rotational position of the spindle motor is again determined until no apparent change is detected in motor position (such as by steps 254, 248, 250, 252).

The electrical rotational position of the spindle motor is preferably determined by sequentially applying a drive pulse to each of a plurality of commutation states respectively corresponding to each of the electrical rotational positions, and measuring a corresponding rise time for a resulting voltage induced by application of each said drive pulse, said rise time determined in relation to impedance of the spindle motor determined in turn by the electrical rotational position of the spindle motor.

For purposes of the appended claims, the function of the recited "means for initializing the disc drive to bring the spindle motor to a final, operational rotational velocity after determining that the spindle motor is either at rest or rotating at a rotational velocity less than the intermediate velocity due to an absence of detected bemf from the spindle motor, by identifying the electrical rotational position of the spindle motor, applying a braking force to the spindle motor, and detecting a change in the electrical rotational position of spindle motor after application of the braking force" will be understood as being carried out by the disclosed structure including the control logic (134, FIG. 3) and the control processor (120, FIG. 2).

It is to be understood that even though numerous characteristics and advantages of various embodiments of the present invention have been set forth in the foregoing description, together with details of the structure and function thereof, this detailed description is illustrative only, and changes may be made in detail, especially in matters of structure and arrangement of parts within the principles of the invention to the full extent indicated by the broad general meaning of the terms in which the appended claims are expressed. For example, the particular elements may vary depending on the particular application for the system while maintaining the same functionality without departing from the spirit and scope of the invention.

In addition, although the embodiments described herein are directed to a disc braking routine for a disc drive, it will be appreciated by those skilled in the art that the routine can be used in other applications to brake a rotatable member without departing from the spirit and scope of the claimed invention.

What is claimed is:

1. A method for initializing a disc drive having a spindle motor, back electromotive force (bemf) detection circuitry which detects bemf from rotation of the spindle motor above an intermediate velocity, and commutation circuitry which electrically commutates the spindle motor in relation to the detected bemf over a range of electrical rotational positions, the method comprising steps of:
   (a) determining the spindle motor to be either stationary or rotating at a rate below the intermediate velocity in relation to an absence of detected bemf from the spindle motor;
   (b) identifying the electrical rotational position of the spindle motor;
   (c) applying a braking force to the spindle motor;
   (d) subsequently identifying the electrical rotational position of the spindle motor after application of the braking force of step (c); and
   (e) determining whether the spindle motor is still rotating in relation to a change between the electrical rotational position identified in step (d) and the electrical rotational position identified m step (b).

2. The method of claim 1, further comprising a step of:
   (f) accelerating the spindle motor from rest to a final, operational velocity at which data are transferred from a disc supported by the spindle motor and a host device when no apparent change is detected between the electrical rotational position identified in step (d) and the electrical rotational position identified in step (b).

3. The method of claim 1, further comprising steps of:
   (f) when the spindle motor is determined to still be rotating, repeating steps (c) and (d) until no apparent change is detected in the electrical rotational position of the spindle motor; and
   (g) accelerating the spindle motor from rest to a final, operational rotational velocity at which data are transferred from a disc supported by the spindle motor and a host device.

4. The method of claim 1, wherein the identifying step (b) comprises steps of:
   (b1) sequentially applying a drive pulse to each of a plurality of commutation states respectively corresponding to each of the electrical rotational positions; and
   (b2) measuring a corresponding rise time for a resulting voltage induced by application of each said drive pulse, said rise time determined in relation to impedance of the spindle motor determined in turn by the electrical rotational position of the spindle motor.

5. The method of claim 4, wherein the identifying step (d) comprises steps of:
   (d1) sequentially applying a drive pulse to each of a selected subset of the commutation states less than the plurality of commutation states; and
   (d2) measuring a corresponding rise time for a resulting voltage induced by application of each said drive pulse applied during step (d1).

6. A disc drive, comprising:
   a spindle motor configured to rotate at least one recording disc;
   a read/write bead configured to write data to the disc and read data from the disc;
   back electromotive force (bemf) detection circuitry coupled to the spindle motor and which detects bemf from rotation of the spindle motor above an intermediate velocity;
   commutation circuitry coupled to the bemf detection circuitry and spindle motor which electrically commutates the spindle motor in relation to the detected bemf over a range of electrical rotational positions of the spindle motor; and
   a control circuit which, upon initialization of the disc drive, determines the presence or absence of detected bemf from the bemf detection circuitry, and in the absence of detected bemf sequentially identifies the electrical rotational position of the spindle motor, directs the application of a braking force to the spindle motor, determines whether the spindle motor is rotating in relation to a change in the electrical rotational position of the spindle motor, and commands an acceleration of the spindle motor to a final, operational velocity by the commutation circuitry when the spindle motor is determined to be at rest, wherein the final, operational velocity is a velocity at which user data are read from the disc and transferred to a host device.

7. The disc drive of claim 6, wherein the control circuit further operates to command the alternating application of additional braking forces to the spindle motor followed by determinations of the electrical rotational position of the spindle motor until the spindle motor is determined to be at rest.

8. The disc drive of claim 6, further comprising spindle driver circuitry coupled to the spindle motor and the commutation circuitry and which applies drive pulses to each of a plurality of windings of the spindle motor in response to commutation pulses from the commutation circuitry to rotate the spindle motor, wherein the control circuit identifies the electrical rotational position of the spindle motor by directing the spindle driver to sequentially apply a drive pulse to each of a plurality of windings of the spindle motor and measuring a corresponding rise time for a resulting voltage induced by inductance of said windings in relation to the electrical rotational position of the spindle motor.

9. The disc drive of claim 8, wherein the spindle driver circuitry comprises:
   a sense resistor connected in series between the plurality of windings of the spindle motor and ground; and
   a comparator having a positive input and a negative input the positive input connected in parallel with the sense resistor to receive a motor sense voltage and the negative input connected to receive a reference threshold voltage, wherein the comparator outputs a pulse when the motor sense voltage reaches the reference threshold voltage, and wherein the control circuit determines the rise time in relation to the pulse output by the comparator.

10. The disc drive of claim 6, wherein the control circuit comprises control logic coupled to the commutation circuitry and the bemf detection circuitry, and a top level programmable processor coupled to the control logic and which father directs the transfer of data between the disc and the host device.

11. A disc chive, comprising:
   a spindle motor configured to rotate at least one recording disc;
   a read/write head configured to write data to the disc and read data from the disc;
   back electromotive force (bemf) detection circuitry coupled to the spindle motor and which detects bemf from rotation of the spindle motor above an intermediate velocity;
   commutation circuitry coupled to the bemf detection circuitry and spindle motor which electrically commutates the spindle motor in relation to the detected bemf over a range of electrical rotational positions of the spindle motor; and
   means for initializing the disc drive to bring the spindle motor to a final, operational rotational velocity at which user data are transferred between the disc and a host device alter determining that the spindle motor is either at rest or rotating at a rotational velocity less than the intermediate velocity due to an absence of detected bemf from the spindle motor, by identifying the electrical rotational position of the spindle motor, applying a braking force to the spindle motor, and detecting a change in the electrical rotational position of spindle motor after application of the braking force.

12. The disc drive of claim 11, wherein the means for initializing comprises control logic coupled to the commutation circuitry and the bemf detection circuitry, and a top level programmable processor coupled to the control logic and which further directs the transfer of data between the disc and the host device.

13. A method, comprising:
   detecting an absence of sensed rotation from a motor;
   sequentially identifying a first electrical rotational position of the motor, applying a braking force to the motor and identifying a second electrical rotational position of the motor; and
   determining the motor to be in the stopped condition or in the low speed rotation condition in relation to the first and second electrical rotational positions.

14. The method of claim 13, wherein the detecting step comprises detecting an absence of rotation induced back electromotive force (bemf) from a motor indicative of a stopped condition or a low speed rotation condition of the motor.

15. The method of claim 13, wherein the applying a braking force step comprises electrically shorting at least two phases of the motor for a selected period of time.

16. The method of claim 13, further comprising repeating the sequentially identifying step when the determining step determines the motor to be in the low speed rotation condition.

17. The method of claim 13, further comprising accelerating the motor to an operational velocity when the determining step determines the motor to be in the stopped condition.

18. The method of claim 13, wherein the first electrical rotational position is identified by steps comprising sequentially applying a drive pulse to each of a plurality of commutation states respectively corresponding to each of the electrical rotational positions, and measuring a corresponding rise time for a resulting voltage induced by application of each said drive pulse, said rise time determined in relation to impedance of the motor determined in turn by the electrical rotational position of the motor.

19. The method of claim 18, wherein the second electrical rotational position is identified by steps comprising sequentially applying a drive pulse to each of a selected subset of the commutation states less than the plurality of commutation states, and measuring a corresponding rise time for a resulting voltage induced by application of each said drive pulse applied to the selected subset of the commutation states.

20. The apparatus of claim 13, wherein the motor is characterized as a spindle motor in a data storage device configured to rotate a data storage medium.

21. An apparatus, comprising:
   a rotatable motor, and
   a motor control circuit which detects an absence of sensed rotation from the motor, sequentially identifies a first electrical rotational position of the motor, applies a braking force to the motor and identifies a second electrical rotational position of the motor, and then determines the motor to be in a stopped condition or in a low speed rotation condition in relation to the first and second electrical rotational positions.

22. The apparatus of claim 21, wherein the motor control circuit detects the absence of sensed rotation from the motor in relation to an absence of rotation induced back electromotive force (bemf) from the motor.

23. The apparatus of claim 21, wherein the motor control circuit applies a braking force by electrically shorting at least two phases of the motor for a selected period of time.

24. The apparatus of claim 21, wherein the motor control circuit further accelerates the motor to an operational velocity when the motor is determined to be in the stopped condition.

25. The apparatus of claim 21, wherein the motor control circuit identifies the first electrical rotational position by sequentially applying a drive pulse to each of a plurality of commutation states respectively corresponding to each of the electrical rotational positions, and measuring a corresponding rise time for a resulting voltage induced by application of each said drive pulse, said rise time determined in relation to impedance of the motor determined in turn by the electrical rotational position of the motor.

26. The apparatus of claim 25, wherein the motor control circuit identifies the second electrical rotational position by sequentially applying a drive pulse to each of a selected subset of the commutation states less than the plurality of commutation states, and measuring a corresponding rise time for a resulting voltage induced by application of each said drive pulse applied to the selected subset of the commutation states.

27. The apparatus of claim 21, wherein the motor is characterized as a spindle motor in a data storage device configured to rotate a data storage medium.

* * * * *